United States Patent [19]

Kaiser

[11] Patent Number: 4,642,859

[45] Date of Patent: Feb. 17, 1987

[54] RETAINING CLIP

[75] Inventor: David Kaiser, Warren, Mich.

[73] Assignee: Chrysler Motors Corporation, Highland Park, Mich.

[21] Appl. No.: 877,088

[22] Filed: Jun. 23, 1986

[51] Int. Cl.[4] .......................... F16B 1/00; A44B 21/00
[52] U.S. Cl. .......................................... 24/669; 24/295
[58] Field of Search ................. 24/669, 671, 672, 689, 24/289, 295, 543

[56] References Cited

U.S. PATENT DOCUMENTS

| | | | |
|---|---|---|---|
| 2,291,674 | 8/1942 | Alden | 24/669 |
| 3,183,030 | 5/1965 | Schlueter | 24/669 |
| 3,626,429 | 12/1971 | Toder | 24/669 |
| 3,807,964 | 4/1974 | Meyer | 24/295 |
| 3,878,589 | 4/1975 | Schaefer | 24/669 |
| 4,424,612 | 1/1984 | Muller et al. | 24/669 |

FOREIGN PATENT DOCUMENTS 745391 2/1956 United Kingdom ................. 24/295

Primary Examiner—Victor N. Sakran
Attorney, Agent, or Firm—Edward A. Craig

[57] ABSTRACT

A retaining clip for positioning and holding a member which has been inserted through an opening in a plate or partition is provided. The clip has a U-shaped structure and is fabricated of a springy sheet material. Oppositely disposed first and second legs each have a central slot to thereby define four arms. Two of the arms, which are diametrically opposed, are used to flex laterally to permit insertion of a member therebetween upon insertion of the member into an opening defined by registering portions of the slots.

4 Claims, 3 Drawing Figures

RETAINING CLIP

BACKGROUND OF THE INVENTION

1. Field of the Invention:

This invention relates to a retaining clip for positioning and holding a member which has been inserted through an opening in a plate or partition.

2. Prior Art:

In the assembly of automobiles and trucks, it is frequently necessary to hold or retain members which pass through a plate or partition. For example, the parking brake cable extends from an operating mechanism, normally a foot pedal, located in a position accessible to the driver. The cable extends through a body panel structure and is normally connected to the rear wheel brakes. It is desired to securely retain the cable structure at the point that it passes through a body panel or partition.

In the past, retaining clips for this function have generally been spring-type clips of a single layer of sheet springy material. Such clips have had a generally bowed shape with opening structure to engage a cable or rod. The bowed shape has included feet structure which presses against the partition or panel and which must be entirely seated to result in spring pressure being applied to secure the retained member in place. The problem with such clips is that, because the spring action is obtained as a result of the clip pressing against the panel, it has been necessary to construct such clips in sizes which are relatively large. Construction requirements in modern automotive design have placed severe restrictions on the amount of space available for the mounting of such clips. As above mentioned, it is necessary that the clip be firmly pressed against the panel or partition. However, frequently there is not enough space for this to occur. As a consequence of the clips being either too wide or too long, space has frequently not been available for the clip feet to touch and hold against the support surface. If a portion of such clips does not touch the support surface, the clip will not property secure the retained member in place.

In the present retaining clip design, it is not necessary that the entire back of the clip be pressed against the support surface in order for the spring action to take place. The retaining clip is provided in a U-shaped design wherein the spring action is between the legs of the clip and the support surface and member being retained. Consequently, it is not necessary to provide a specifically sized backing area for the retaining clip.

Another problem with prior art clips is that they have not provided means for mounting of the clip. This has resulted in an assembly problem wherein frequently the assembler hand-mounts the clip with difficulty. In the present construction, the retaining clip is provided with a loop which is engageable with the mounting tool for installing the clip. The loop also aids in providing flexibility of the clip legs which facilitates mounting of the clip.

SUMMARY OF THE INVENTION

The retaining clip comprises a U-shaped structure which is fabricated of springy sheet material. The clip has first and second legs joined together at one end by a web. The other ends of the legs are free. Each leg has a slot extending from the free end thereof toward the web and terminating intermediate the ends of the leg. The slots define first and second arms in the first leg and third and fourth arms in the second leg. The slots are offset laterally with respect to each other but with a portion of each slot being in registry with the other slot to define an opening to receive the shank of a member to be retained. The member has a shank with an enlarged head thereon.

The first arm is oppositely disposed from the third arm and the second arm is oppositely disposed from the fourth arm. Each arm has an inner edge defined by the respective slots. The inner edge of the first arm is offset inwardly with respect to the inner edge of the third arm and the inner edge of the fourth arm is offset inwardly with respect to the inner edge of the second arm whereby the inner edges of the first and fourth arms define the opening to receive the shank of a member to be retained.

An inwardly extending nib is provided on the inner edge of the first and fourth arm adjacent the free ends thereof. The retainer clip is adapted to be received on the shank of the member to be retained after the shank and enlarged head have been inserted through an opening in a support structure. The retainer clip, by means of the opening, is received on the shank between the enlarged head and the support structure with the nibs first contacting the shank and causing the first and fourth arms to spread apart in a scissors action with the first and fourth arms closing after the nibs have passed by the shank. The legs thereafter exert a spring pressure between the enlarged head and support structure and the nibs prevent repassage of the shank out of the opening.

The web comprises an elongated loop extending outwardly along the elongated dimension thereof away from the legs to permit insertion of a tool for mounting the retainer clip.

Each nib has a cam surface extending from a point on the inner edge and adjacent to the free end of its respective arm angled inwardly and towards the web. The cam surface is adapted to contact the shank upon insertion thereof to facilitate spreading of the first and fourth arms. Each nib has an edge at the terminus of the cam surface which extends straight back to the inner edge of its respective arm to form a stop preventing repassage of the shank out of the opening. The free ends of the first and second arms are angled towards and touch the third and fourth arms respectively to aid in exerting spring pressure between the enlarged head and support structure.

BRIEF DESCRIPTION OF A PREFERRED EMBODIMENT

Referring to the figures, it will be noted that the retaining clip 10 comprises a U-shaped structure. This structure is fabricated of a springy sheet material which may be of a metallic or plastic composition. The clip 10 has first and second legs 12, 14 joined together at one end by a web 16. The other ends of the legs 12, 14 are free.

Each leg has a slot 18, 20 which extends from the free end thereof toward the web 16. The slots terminate intermediate of the ends of the legs 12, 14.

Figure 1:
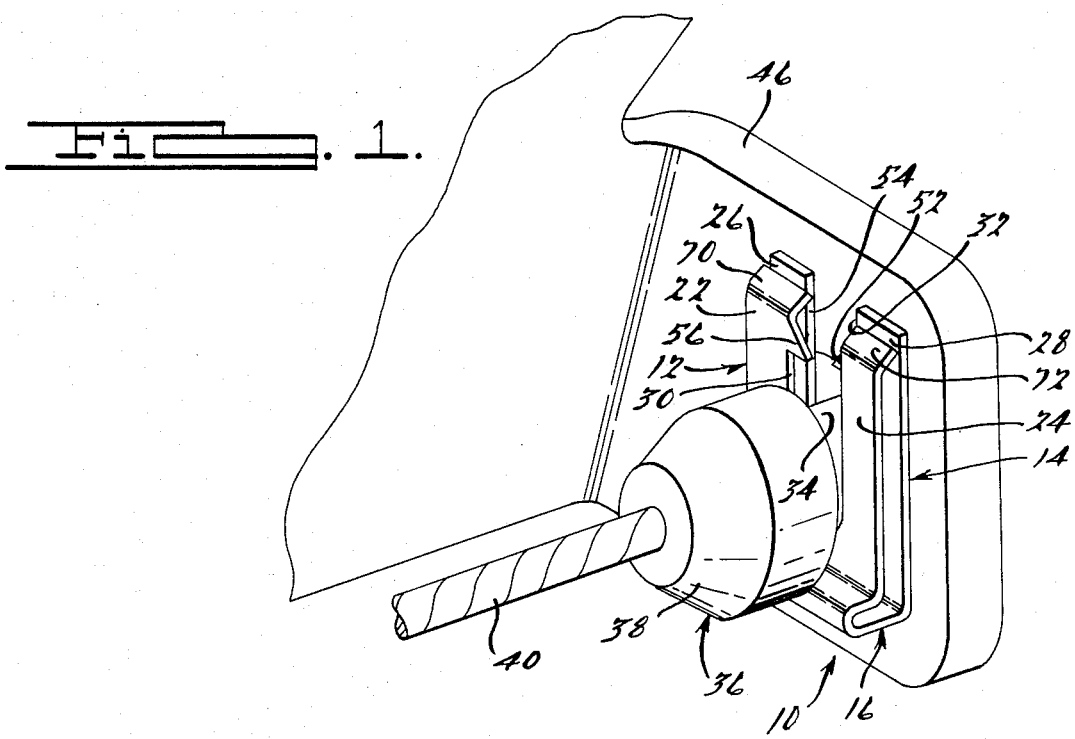
FIG. 1 is a view in perspective of one embodiment of the retaining clip of the present invention illustratively mounted on the shank of a member having an enlarged head, with the head and a portion of the shank inserted through an opening in a support structure.
Figures 2, 3:
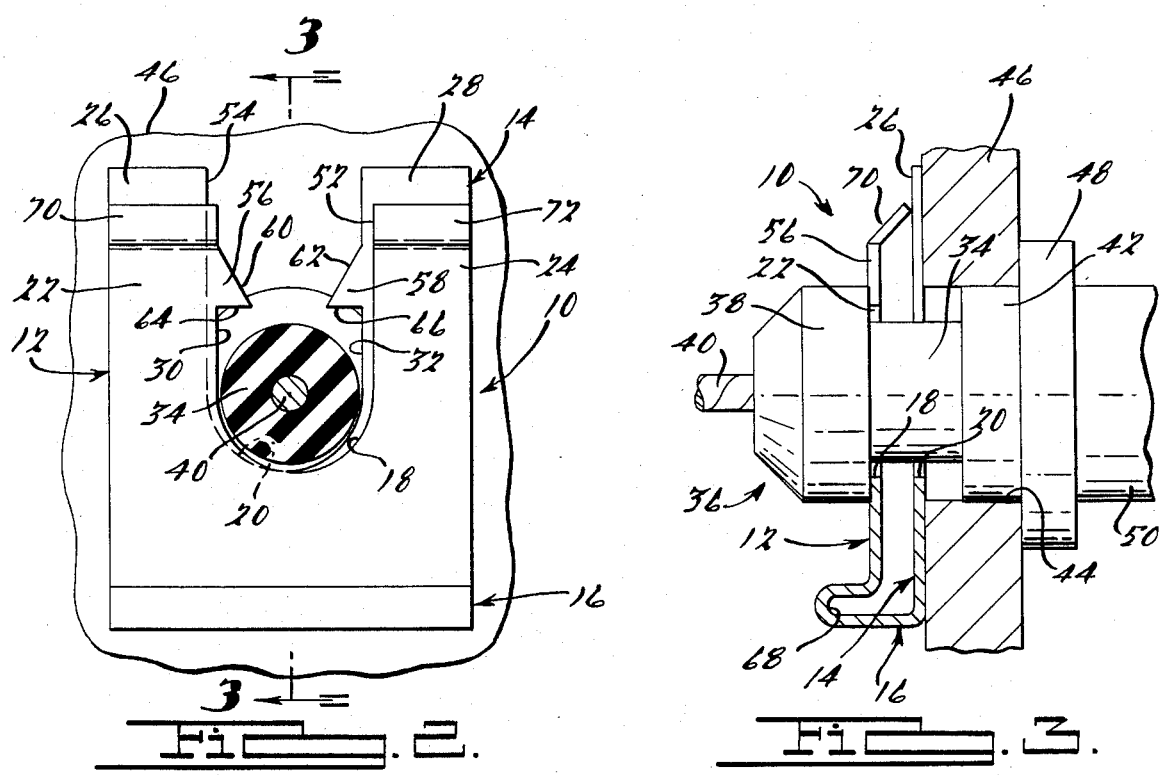
FIG. 2 is a front elevational view of the retaining clip and associated structure of FIG. 1 with portions broken away for the purpose of clarity.
FIG. 3 is a sectional view taken substantially along the line 3—3 of FIG. 2 looking in the direction of the arrows.

The slots 18, 20 define first and second arms 22, 24 in the first leg 12 and third and fourth arms 26, 28 in the second leg 14. The slots 18, 20 are offset laterally with respect to each other. However, as will be noted particularly in FIG. 2, a portion of each slot is in registry with the other slot to define an opening described by the inner edges 30, 32 of the first arm 22 and fourth arm 28. This opening is adapted to receive the shank 34 of a member 36 to be retained in the clip 10. The member 36 includes the shank 34 and an enlarged head 38. The member 36 illustratively forms part of a cable mount for a parking brake cable 40 of a vehicle. An annular flange 42 is provided on the opposite end of the shank 34 and is received in an opening 44 provided in a support member 46. A second enlarged annular flange 48 is provided on the other side of the flange 42 to abut against the reverse surface of the support member 46. Tubular structure 50 extends from flange 48. The cable 40 extends through this mounting structure. At one end, as is conventional, the cable 40 may be connected to a hand lever or foot lever while at the other end the cable is conventionally operatively connected to the rear brakes of a vehicle.

The first arm 22 is oppositely disposed from the third arm 26 and the second arm 24 is oppositely disposed from the fourth arm 28. Each arm has an inner edge, the first and fourth arms having inner edges 30, 32, as aforementioned, while the second and third arms have inner edges 52, 54. The inner edge 30 of the first arm is offset inwardly with respect to the inner edge 54 of the third arm and the inner edge 32 of the fourth arm is offset inwardly with respect to the inner edge 52 of the second arm whereby the inner edges of the first and fourth arms define said opening to receive the shank 34 of member 36 as previously described.

An inwardly extending nib 56, 58 is provided on the inner edges 30, 32 of the first and fourth arms adjacent the free ends thereof. Each nib 56, 58 has a cam surface 60, 62 extending from a point on the inner edges 30, 32 and adjacent to the free ends of the respective arms. The cam surfaces 60, 62 are angled inwardly and towards the web 16. The cam surfaces 60, 62 are adapted to contact the shank 34 upon insertion thereof into the opening defined by edges 30, 32 to facilitate spreading of the first and fourth arms 22, 28. Spreading of the arms permits insertion of the shank 34 past the nibs 56, 58. Each nib has an edge 64, 66 at the terminus of a cam surface 60, 62. The edges 64, 66 extend straight back to the inner edges 30, 32 of the respective arms to form stops preventing repassage of the shank 34 out of the retaining clip after the shank has been inserted. As will be appreciated, the arms 30, 32 may be manually spread apart to extract the shank if desired.

The retaining clip 10 is adapted to be received on the shank 34 of the member 36 after the shank and enlarged head 38 have been inserted through the opening 44 with the flange 42 received in the opening and the flange 48 pressing against the support member 46. As above described, the retaining clip is then received on the shank with the cam surfaces 60, 62 of the nibs 56, 58 first contacting the shank and causing the first and fourth arms 22, 28 to spread apart in a scissors action. These arms close after the nibs have passed by the shank. The legs 22, 28 thereafter exert a spring pressure between the enlarged head 38 and support member 46 with the nibs preventing repassage of the shank out of the opening. As will be appreciated, it is not necessary for the arms 26, 28 to be in complete contact with the support member 46 for the spring pressure to be exerted inasmuch as the pressure is exerted between two fixed surfaces, namely, those of the head 38 and support member 46.

The web 16 comprises an elongated loop which extends outwardly along the elongated dimension thereof away from the legs 12, 14 and support member 46. The portion 68 of the loop provides a convenient opening for insertion of a tool for mounting a retaining clip. A tool may first be used to engage the loop portion 68 of the clip 10 which will then enable the clip 10 to be easily inserted onto the shank 34 of the member 36.

The ends 70, 72 of the first and second arms 22, 24 are angled towards and touch the third and fourth arms 26, 28 and exert a spring pressure thereagainst which is experienced between the enlarged head 38 and support member 46 to augment the normal spring pressure exerted by the first and second legs 12, 14. It will be appreciated that the space between the head 38 and support member 46 is designed to be less than the unsprung width of the retaining clip 10 so that when the retaining clip 10 is inserted in place it will exert pressure between the head 38 and support member 46.

I claim:

1. A retaining clip comprising a U-shaped structure fabricated of springy sheet material and having first and second legs joined together at one end by a web, the other ends of the legs being free, each leg having a slot extending from the free end thereof toward the web and terminating intermediate the ends of the leg, the slots defining first and second arms in the first leg and third and fourth arms in the second leg, the slots being offset laterally with respect to each other but with a portion of each slot being in registry with the other slot to define an opening to receive the shank of a member to be retained, said member including said shank with an enlarged head thereon, the first arm being oppositely disposed from the third arm and the second arm being oppositely disposed from the fourth arm, each arm having an inner edge defined by the respective slots, the inner edge of the first arm being offset inwardly with respect to the inner edge of the third arm and the inner edge of the fourth arm being offset inwardly with respect to the inner edge of the second arm whereby the inner edges of the first and fourth arms define said opening to receive the shank of a member to be retained, an inwardly extending nib on the inner edge of the first and fourth arms adjacent the free ends thereof, the retaining clip being adapted to be received on the shank of said member after the shank and enlarged head have been inserted through an aperture in a support structure, the retaining clip, by means of said opening, being received on the shank between the enlarged head and the support structure with the nibs first contacting the shank and causing the first and fourth arms to spread apart in a scissors action with the first and fourth arms closing after the nibs have passed by the shank, the legs thereafter exerting a spring pressure between the enlarged head and support structure and the nibs preventing repassage of the shank out of said opening.

2. A retaining clip as defined in claim 1, further characterized in that the web comprises an elongated loop extending outwardly along the elongated dimension thereof away from the legs to permit insertion of a tool for mounting the retaining clip.

3. A retaining clip as defined in claim 1, further characterized in that each nib has a cam surface extending from a point on the inner edge and adjacent to the free end of its respective arm angled inwardly and towards the web, said cam surfaces adapted to contact said shank upon insertion thereof to facilitate spreading of the first and fourth arms, each nib having an edge at the terminus of the cam surface which extends straight back to the inner edge of its respective arm to form a stop preventing repassage of the shank out of said opening.

4. A retaining clip as defined in claim 1, further characterized in that the free ends of the first and second arms are angled towards and touch the third and fourth arms respectively to aid in exerting said spring pressure between the enlarged head and support structure.

* * * * *